(12) United States Patent
Mishra et al.

(10) Patent No.: US 8,046,167 B2
(45) Date of Patent: Oct. 25, 2011

(54) NAVIGATION WITH CONTEXTUAL COLOR, TEXTURE, AND STRUCTURE CUES

(75) Inventors: Pragyana K Mishra, Kirkland, WA (US); Nagendra V Kolluru, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 12/117,734

(22) Filed: May 8, 2008

(65) Prior Publication Data
US 2009/0281728 A1 Nov. 12, 2009

(51) Int. Cl.
*G01C 21/00* (2006.01)
(52) U.S. Cl. ........ 701/210; 701/206; 701/208; 701/211; 340/995.14; 340/995.24; 340/995.27
(58) Field of Classification Search .................. 701/201, 701/206, 208, 210–212; 340/995.2, 995.14, 340/995.23, 995.24, 995.27
See application file for complete search history.

(56) References Cited

U.S. PATENT DOCUMENTS

| | | | |
|---|---|---|---|
| 5,381,338 A | 1/1995 | Wysocki et al. | |
| 6,038,559 A | 3/2000 | Ashby et al. | |
| 6,199,014 B1 * | 3/2001 | Walker et al. | 701/211 |
| 6,449,384 B2 | 9/2002 | Laumeyer et al. | |
| 7,089,110 B2 | 8/2006 | Pechatnikov et al. | |
| 7,092,548 B2 | 8/2006 | Laumeyer et al. | |
| 7,251,561 B2 | 7/2007 | Dotan et al. | |
| 2002/0123841 A1 * | 9/2002 | Satoh et al. | 701/208 |
| 2006/0142941 A1 | 6/2006 | Imai et al. | |
| 2006/0230337 A1 | 10/2006 | Lamont et al. | |

OTHER PUBLICATIONS

Wang et al., "Road Extraction from Remote Sensing Image Based on Multi-resolution Analysis", pp. 4.
Predic et al., "Developing Context Aware Support in Mobile GIS Framework", Presented at the 9th AGILE Conference on Geographic Information Science, 2006, pp. 8.
"Virtual Earth Enterprise", 2007, Microsoft Corporation, pp. 4.
Pomplun et al., "Investigating the Visual Span in Comparative Search: The Effects of Task Difficulty and Divided Attention", Cognition, vol. 81, No. 2, Sep. 2001, pp. 19.
Ulrich et al., "Appearance-Based Obstacle Detection with Monocular Color Vision", Proceedings of the AAAI National Conference on Artificial Intelligence, Jul./Aug. 2000, pp. 6.
Turk et al., "VITS-A Vision System for Autonomous Land Vehicle Navigation", IEEE Transactions on Pattern Analysis and Machine Intelligence, IEEE Computer Society, vol. 10, No. 3 May 1988, pp. 342-361.

(Continued)

*Primary Examiner* — Gertrude Arthur Jeanglaude
(74) *Attorney, Agent, or Firm* — Capitol City TechLaw; Richard C. Irving

(57) ABSTRACT

A method and a processing device may provide navigational information including non-photographic cues, such as, contextual color, texture, and structure cues, corresponding to physical entities visible to a party traveling along a determined route. In one embodiment, the non-photographic cues may be previously stored in a database. In another embodiment, non-photographic cues may be extracted from at least one provided image of a geographic area. In a third embodiment, a sequence of non-photographic cues may be automatically extracted from at least one image of a geographic area and, if the sequence of non-photographic cues was not previously saved, the sequence of non-photographic cues may be saved, along with related information, for later use when the sequence of non-photographic cues corresponds to a desired location. The provided navigational information may be presented in a number of ways including a simplified map, textual instructions, or generated speech.

20 Claims, 10 Drawing Sheets

OTHER PUBLICATIONS

Lorigo et al., "Visually-guided Obstacle Avoidance in Unstructured Environments", Proceedings of the 1997 IEEE/RSJ International Conference on Intelligent Robots and Systems, vol. 1, Sep. 1997, pp. 7.

Knotts et al., "NaviGates: A Benchmark for Indoor Navigation", Proceedings of the Third International Conference and Exposition on Robotics for Challenging Environments, 1998, pp. 1-8.

* cited by examiner

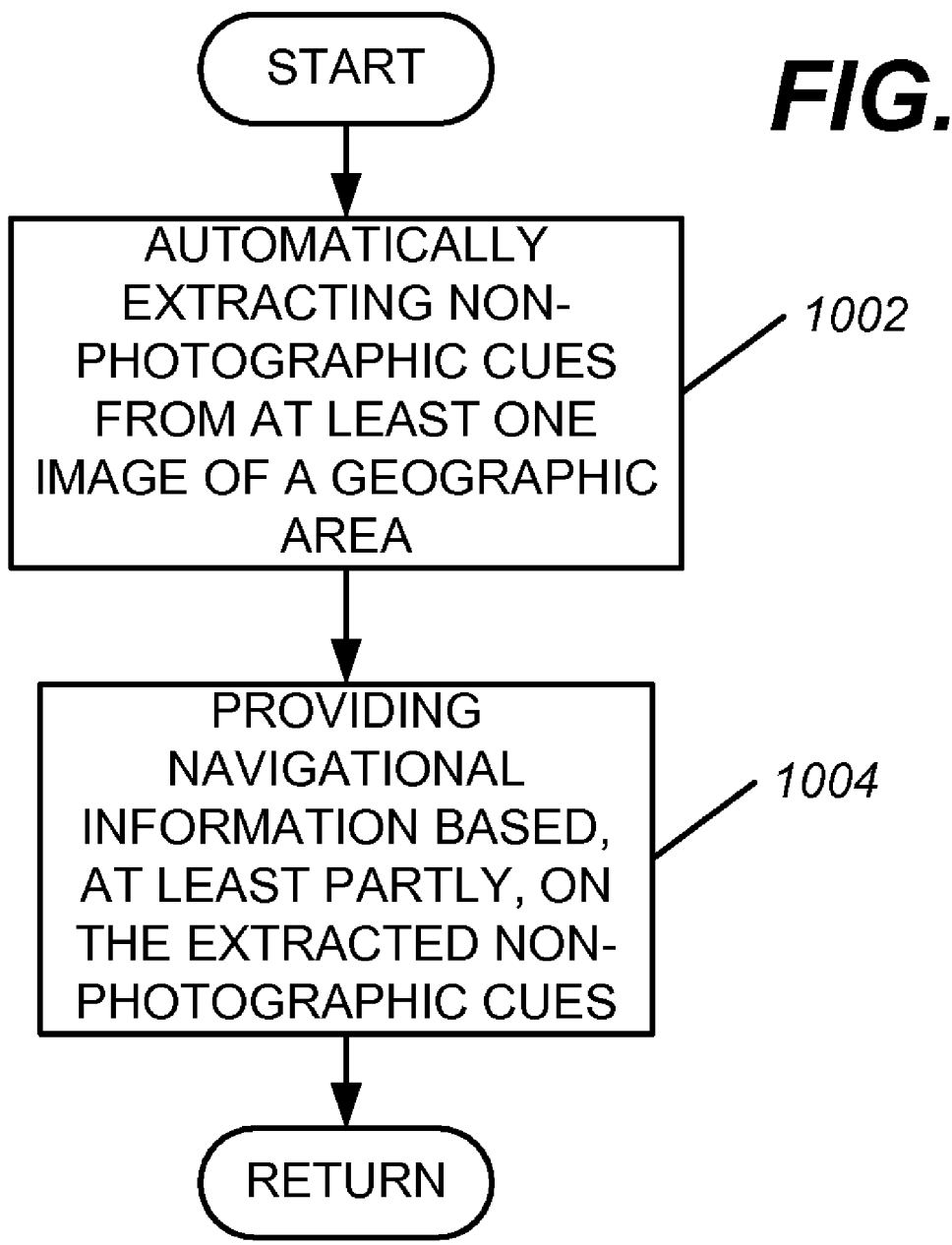

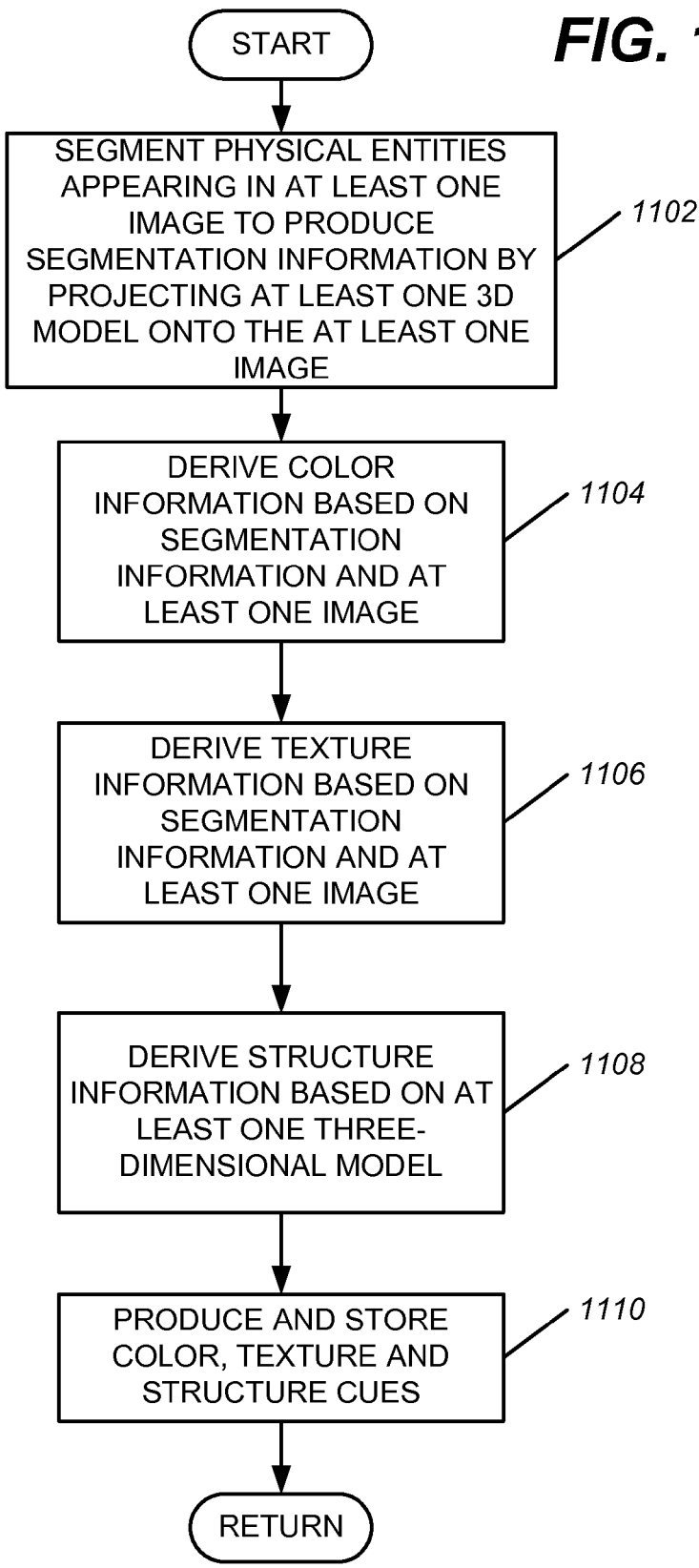

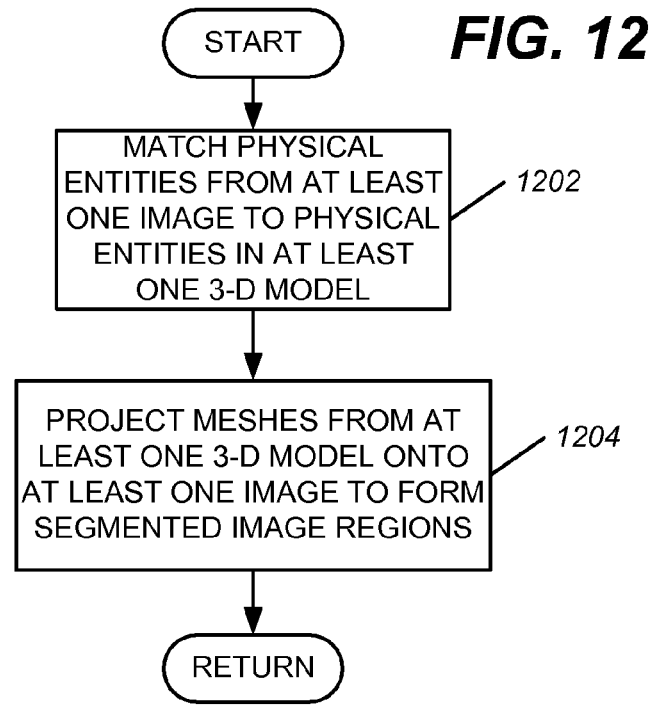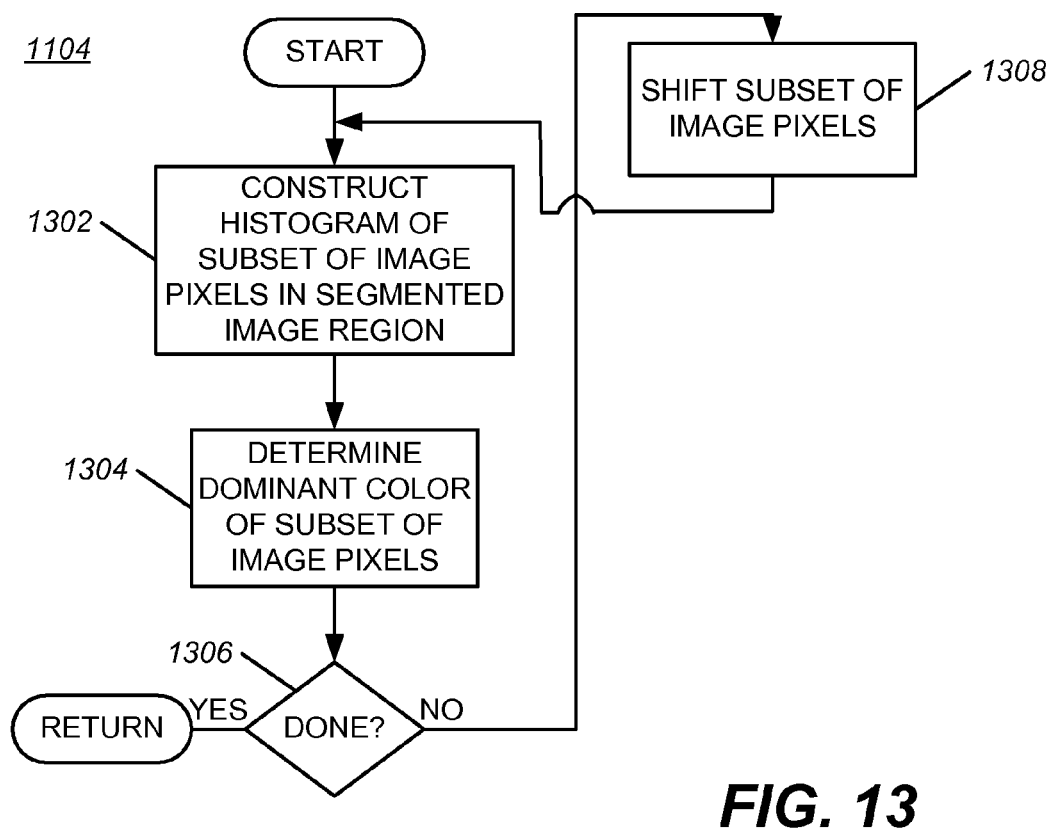

NAVIGATION WITH CONTEXTUAL COLOR, TEXTURE, AND STRUCTURE CUES

BACKGROUND

Existing routing and direction schemes in navigational applications have a number of shortcomings. For example, the existing routing and direction schemes do not provide sufficient content to associate directions with what a party sees while traveling. Vantage points highlighted on maps, typically, are distinct landmarks or signs. However, many residential, suburban, and rural areas have few, if any, distinct landmarks. Urban areas may be cluttered with landmarks and signs, many of which may be difficult for a party to spot while traveling at street level. Further, registration of detailed landmarks or signs for use as vantage points may be computationally intensive for processing devices and may be overwhelming for humans.

Generally, existing navigational applications provide a set of directions as a combination of turns, street names, distances traveled between turns, as well as other information, which may require a party to remember portions of the directions and to precisely measure distances traveled during segments of a route, while avoiding obstacles in an unfamiliar area.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may provide navigational directions including contextual color, texture, and structure cues. In one embodiment, color, texture, and structure cues may be stored in a database. A navigational system may provide a determined route from an origin to a destination. A determination may be made with respect to physical entities visible to a party along the determined route. The database of color, texture, and structure cues may be references in order to obtain color, texture, and structure cues with respect to the physical entities visible to the party along the determined route. Navigational information may be provided and may include the color, the texture, and the structure cues. The navigational information may be provided as a map, presented as a simplified drawing, as text including textual descriptions corresponding to the color, the texture, and the structure cues, or as generated speech including speech describing the color, the texture, and the structure cues.

In a second embodiment, non-photographic cues, such as color cues, texture cues, and structure cues, may be extracted from at least one provided image of a geographic area. Navigational information may be provided and may include information with respect to the extracted non-photographic cues. The navigational information may be provided as a map, as text, or as generated speech.

In a third embodiment, a sequence of non-photographic cues may be automatically extracted from at least one image of a geographic area. If the sequence of non-photographic cues was previously saved, along with related information, the saved sequence of non-photographic cues and the related information may be obtained. If the sequence of non-photographic cues was not previously saved, then a database may be searched for cues matching the sequence of non-photographic cues. Upon finding matching cues, a sequence of cues may be saved, along with related information. Navigational information may then be provided based, at least partly, on the extracted non-photographic cues. The navigational information may be provided as a map, generated speech, or text.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 7:
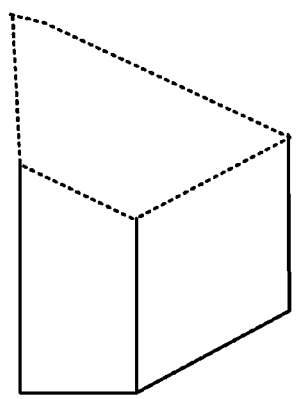

FIG. 7 provides an example of image region segmentation of a physical entity.

FIGS. 8-15 are flowcharts illustrating exemplary processing in embodiments consistent with the subject matter of this disclosure.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a processing device may provide navigational directions with contextual color, texture, and structure cues. In one embodiment consistent with the subject matter of this disclosure, a sequence of non-photographic cues may be derived with respect to physical entities along a route and navigational instructions may be provided for traveling along the route from an origin to a destination. The sequence of non-photographic cues may be provided in a same order as would be encountered by a party traveling along the route from the origin to the destination. The non-photographic cues may be visual cues, which may be predefined and stored in a database. In some embodiments, the non-photographic cues may include information with respect to color, texture, and structure of physical entities along the route.

The navigational instructions may be provided as text with the non-photographic cues, as a map having the non-photographic cues encoded therein, or as generated speech including the non-photographic cues.

In another embodiment consistent with the subject matter of this disclosure, one or more images of a geographic area may be provided. Non-photographic cues, representative of a number of visual attributes of physical entities, may be automatically extracted from the one or more images of a geographic area. Navigational instructions, which may include driving directions in some cases, may be provided based on the automatically extracted non-photographic cues. The navigational instructions may include a description of a location corresponding to the one or more images of the geographic area and distances between locations.

The non-photographic cues may be extracted from the one or more images by deriving segmentation information with respect to physical entities appearing in the one or more images, deriving color and textural information with respect to the physical entities appearing in the one or more images, and deriving structure information based, at least partly, on at least one three-dimensional model of the geographic area.

Exemplary Processing Device

Figure 1:
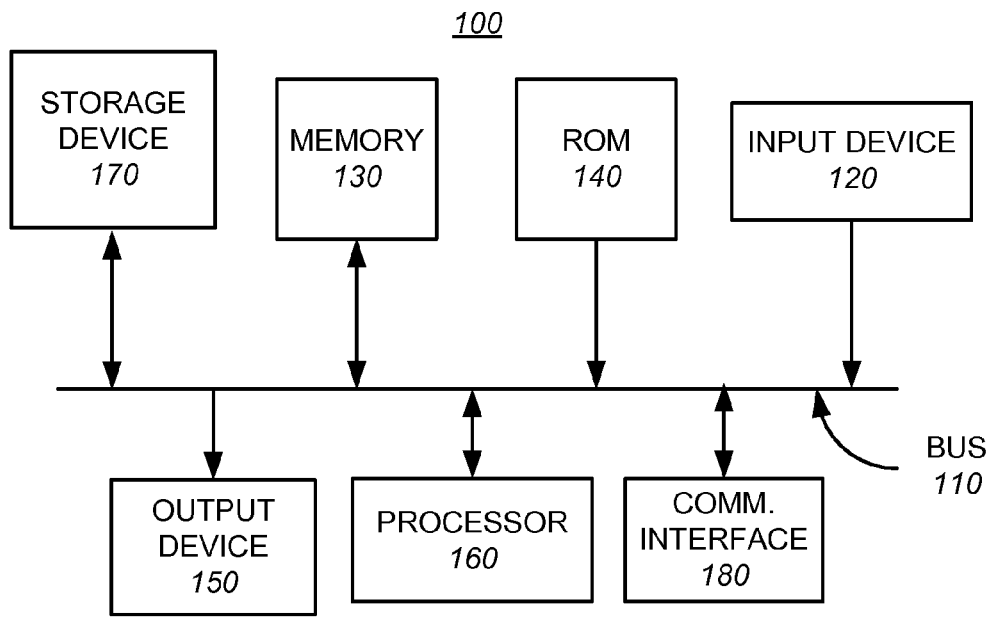
FIG. 1 illustrates a functional block diagram of an exemplary processing device, which may implement embodiments consistent with the subject matter of this disclosure.

FIG. 1 is a functional block diagram of an exemplary processing device 100, which may be used to implement embodiments consistent with the subject matter of this disclosure. Processing device 100 may be a desktop personal computer (PC), a laptop PC, a mobile phone, a personal navigation assistant, a handheld processing device, or other processing device. Processing device 100 may include a bus 110, an input device 120, a memory 130, a read only memory (ROM) 140, an output device 150, a processor 160, and a storage device 170. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include a medium for storing data and/or instructions for processor 160.

Input device 120 may include a keyboard, a touchscreen, a microphone, a pointing device, or other input device. Output device 150 may include a speaker or one or more conventional mechanisms that output information, including one or more display monitors, or other output devices.

Processing device 100 may perform functions in response to processor 160 executing sequences of instructions contained in a tangible machine-readable medium, such as, for example, memory 130, ROM 140, storage device 170 or other media. Such instructions may be read into memory 130 from another machine-readable medium or from a separate device via communication interface 180.

Exemplary Operating Environments

Figure 2:
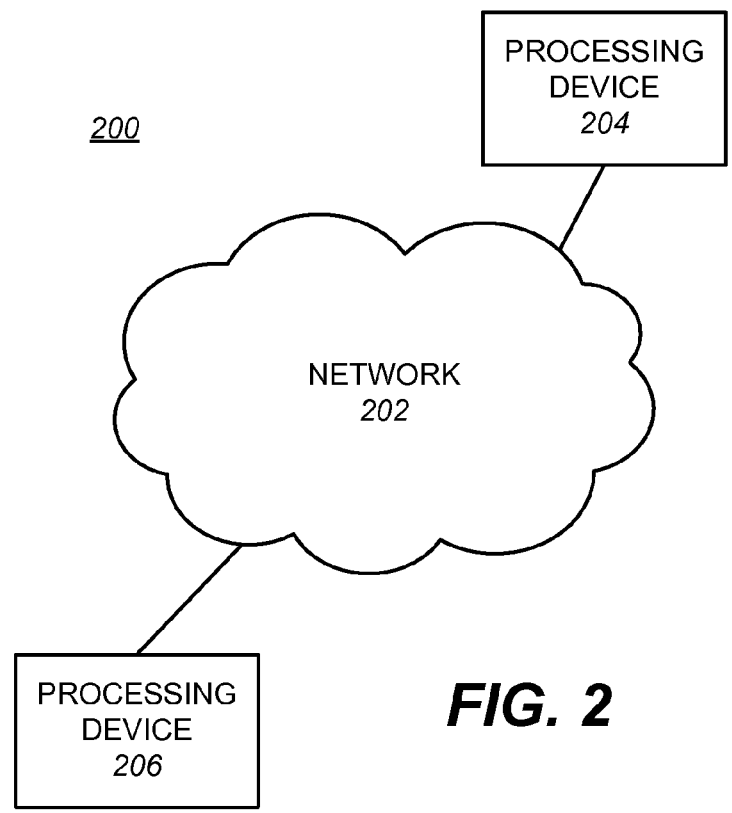
FIGS. 2 and 3 illustrate exemplary environments in which embodiments consistent with the subject matter of this disclosure may operate.

FIG. 2 illustrates an exemplary operating environment 200, in which embodiments consistent with the subject matter of this disclosure may operate. Operating environment 200 may include a network 202, a processing device 204, and a processing device 206.

Processing device 204 may be a user's processing device, such as, for example, a desktop personal computer (PC), a laptop PC, a mobile phone, a personal navigation assistant, a handheld processing device, or other processing device. Processing device 206 may be a server, a server farm, or other processing device or group of processing devices having access to one or more databases, such as, for example, navigational databases.

Processing device 204 may communicate with processing device 206 via network 202. Network 202 may be a single network or a combination of networks, such as, for example, the Internet or other networks. Network 202 may include a wireless network, a wired network, a packet-switching network, a public-switched telecommunications network, a fiber-optic network, other types of networks, or any combination of the above.

Figure 3:
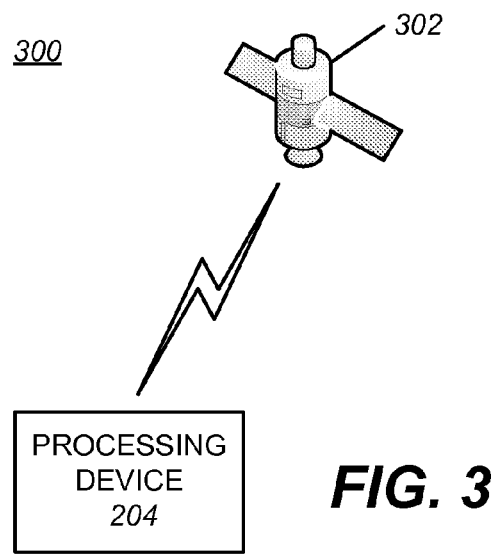

FIG. 3 illustrates a second exemplary operating environment 300, in which embodiments consistent with the subject matter of this disclosure may operate. Operating environment 300 may include processing device 204, as previously described, and a global positioning system (GPS) satellite 302. Processing device 204 may communicate with GPS satellite 302 to obtain up-to-date location information, as well as information with respect to a sequence of cues, such as, for example, visual cues, or other cues, which may be seen along a determined route.

Another operating environment may include a standalone processing device with access to a number of databases.

Figure 4:
FIG. 4 illustrates an exemplary map with encoded color, texture and structure cues.

FIG. 4 is an exemplary map, which may be produced by an embodiment consistent with the subject matter of this disclosure. The map may be a simplified drawing of an area. A route 402 may be indicated by a colored line running along streets of the map. Attributes of physical structures, included in the map, may be encoded into the map. A number of physical structures, labeled as A-H on the exemplary map, may have color, texture, and structure encoded therein. For example, red brick buildings may be shaded red on the map and may be textured to suggest brick. White marble buildings may be shown as white on the map and may be textured to suggest marble. Other colors and textures may also be encoded into physical structures represented on the map. Further, a shape and a height of structures may be encoded into representations of physical structures on the map. For example, a cylindrically-shaped building, which is taller than surrounding buildings, may be represented as cylindrically shaped on the map and as having a height taller than representations of surrounding buildings.

Exemplary Embodiments

Figure 5:
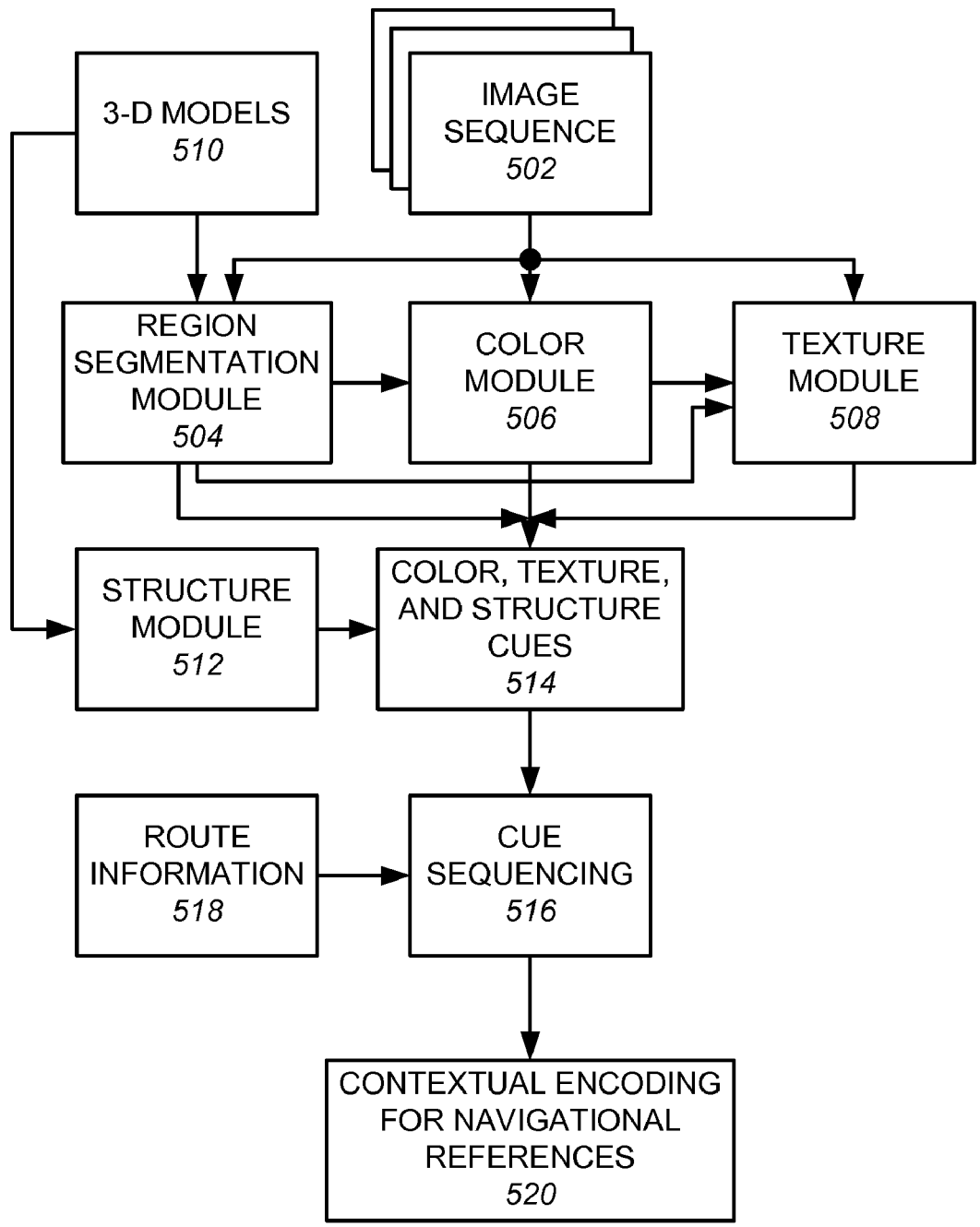
FIG. 5 is a functional block diagram of an embodiment consistent with the subject matter of this disclosure.

FIG. 5 is a block diagram illustrating operation of an exemplary embodiment consistent with the subject matter of this disclosure. An image sequence 502 may be input to a region segmentation module 504, a color module 506, and a texture module 508.

3-D models 510 may be included in a pre-existing database of three-dimensional models created from images of geographic areas. Region segmentation module 504 may match physical structures appearing in an image sequence 502 with physical structures in 3-D models 510. Region segmentation module 504 may project meshes from 3-D models 510 onto physical entities appearing in images of image sequence 502 using calibration parameters of the images to produce segmented image regions. The segmented image regions bounded by a projection of mesh represent facades of physical structures, which may be used for deriving color and texture cues.

Once region segmentation module 504 determines the segmented image regions, color module 506 may construct histograms from pixels within the segmented image regions in order to determine a respective dominant color within the segmented image regions. Texture module 508 may determine texture within the segmented image regions based on properties of collections of pixels within the segmented image regions. Structure module 512 may derive structural cues from 3-D models 510. Examples of structure cues may include a height of a building, a number of stories of a building, a type of a building, as well as other structural cues. Color, texture, and structure cues 514 may be derived from structure cues from structure module 512, color cues from color module 506, and texture cues from texture module 508.

Cue sequencing 516 may use route information 518, produced from a navigation application, to derive sequences of color, texture, and structure cues with respect to physical structures that can be seen along a route. Navigational information, including contextual encoding for navigational references 520, may then be produced. The navigational information may include a map with contextual encoding, textual directions with the contextual encoding appearing as descriptive text within the textual directions, or generated speech with the contextual encoding included as descriptive speech within the generated speech, as well as other navigational information.

Figure 6:
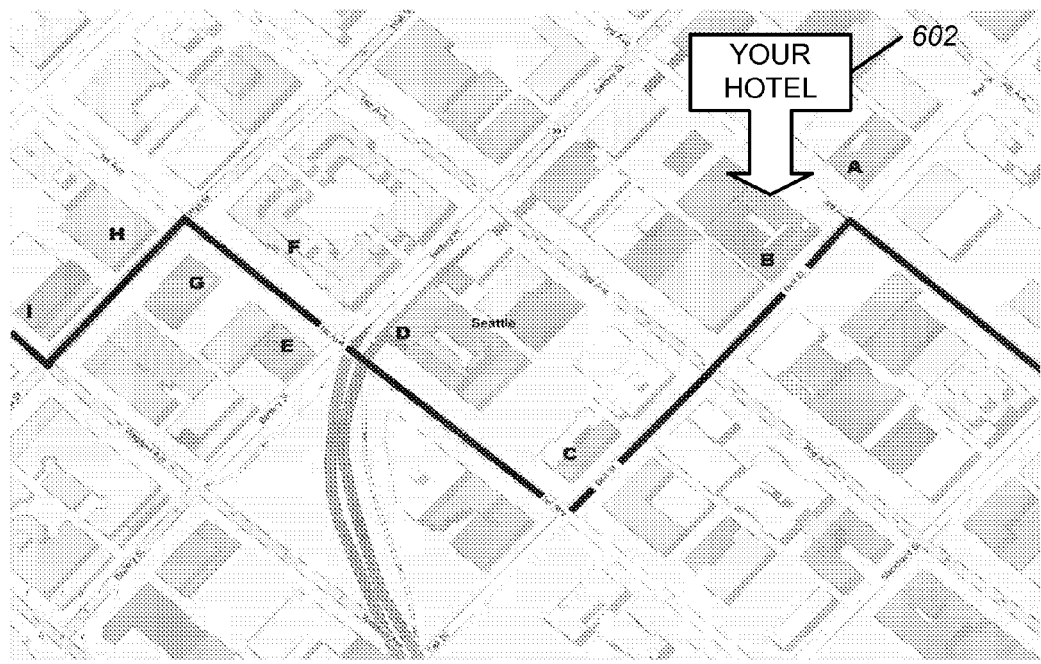
FIG. 6 illustrates a second exemplary map with a hotspot.

Embodiments which produce a map may further include "pushpins" or "hot spots". A pushpin or a hotspot may be a highlighted area on a map which a user may select, with a pointing device or other device, to cause additional information to be displayed. The additional information may include color, structure, and texture of physical structures in the selected area, or other information. FIG. 6 is an exemplary map with a hot spot 602 pointing to a user's hotel. The user may select hotspot 602, which may cause information with respect to the user's hotel to be displayed. For example, characteristics of one or more buildings of the hotel along with an address of the hotel, a list of restaurants in the hotel, room rates, and/or other information may be displayed as a result of selecting hotspot 602.

FIG. 7 illustrates exemplary segmented regions with respect to a physical structure, such as, for example, a building. In FIG. 7, regions bounded mainly by solid lines may represent facades of a building, while a region bounded by a dashed line may represent a roof of the building. Regions corresponding to facades of buildings or areas of physical structures, which are observable from street level, may be used for computing color, structure, and texture cues.

Exemplary Processing

Figure 8:
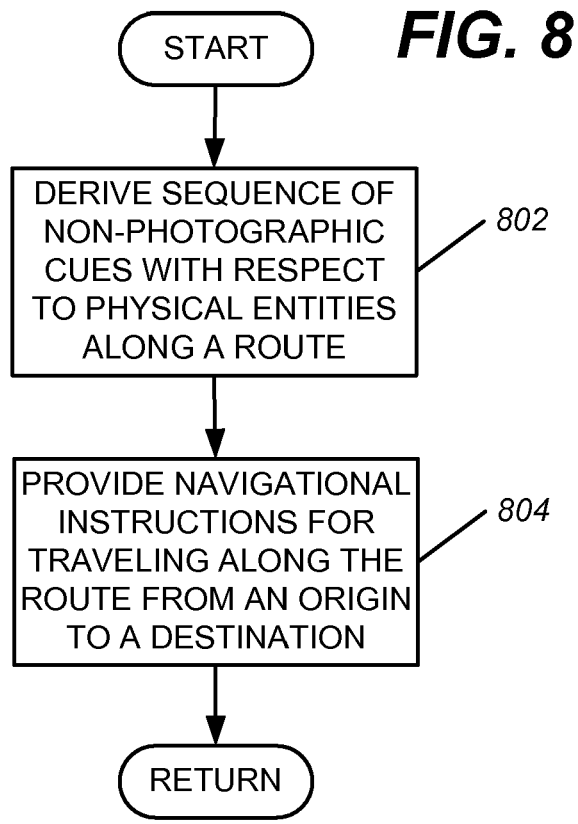

FIG. 8 is a flowchart illustrating an exemplary process in an embodiment consistent with the subject matter of this disclosure. The process may begin with a processing device deriving a sequence of non-photographic cues with respect to physical entities, or structures, along a route (act 802).

Figure 9:
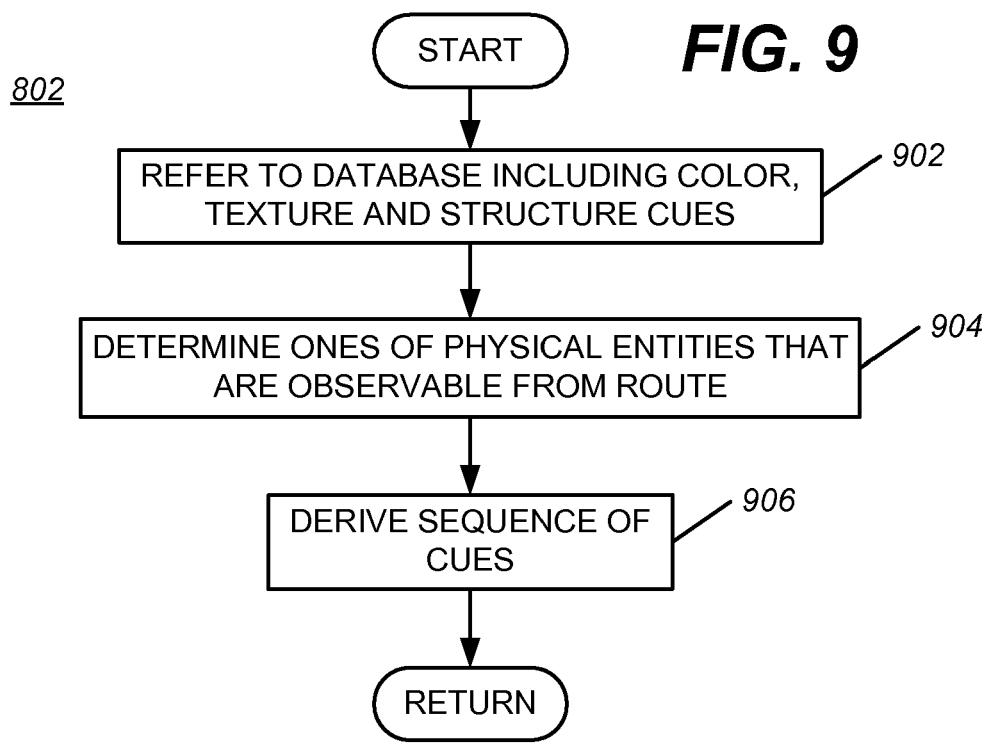

FIG. 9 is a flowchart illustrating an exemplary process for performing act 802 in an embodiment consistent with the subject matter of this disclosure. The process may begin with a processing device referring to a database which may include color, texture, and structure cues (act 902). The processing device may then determine which physical entities, or structures, are observable by a party from the route (act 904). The processing device may then derive a sequence of cues from the database (act 906). The process may then be completed.

Returning to FIG. 8, the processing device may then provide navigational instructions for traveling along the route from an origin to a destination, such that the derived sequence of cues may be included in the navigational instructions (act 804). In one embodiment, the navigational instructions may include a map with color, texture, and structure cues encoded therein, as previously discussed with respect to FIG. 4. In a second embodiment, the navigational instructions may be provided as text and may include a textual description of color, texture, and structure cues. In a third embodiment, the navigational instructions may be provided as generated speech and may include generated speech describing color, texture and structure cues, such as, for example, "a tall red brick building".

In another embodiment, cues may be extracted from a sequence of images and navigational information may be provided based on the extracted cues. The process may begin with a processing device automatically extracting non-photographic cues from at least one image of a geographic area (act 1002).

FIG. 11 is a flowchart illustrating exemplary processing, with respect to act 1002, in detail. The process may begin with the processing device segmenting physical entities, or structures, appearing in at least one image of a geographic area in order to produce segmentation information by projecting at least one 3-D model onto the at least one image (act 1102).

FIG. 12 is a flowchart illustrating exemplary processing, with respect to act 1102, in detail. The process may begin with the processing device matching physical entities in the at least one image to physical entities represented in at least one a 3-D model, which may be included in a database (act 1202). Meshes from the at least one 3-D model may be projected onto the at least one image to form segmented image regions (act 1204). The process may then be completed.

Returning to FIG. 11, the processing device may then derive color information based on the produced segmentation information (act 1104).

FIG. 13 is a flowchart illustrating an exemplary process for performing act 1104, in detail. The process may begin with constructing a histogram of a subset of image pixels in a segmented image region (act 1302). All pixels within a segmented image region may be used to construct the histogram in order to determine a dominant color. However, because of pixel noise, reflectance variations, or other factors, a total region may be affected by outliers. Considering a smaller window that may be moved to cover smaller subsets of pixels, at a time, within the segmented image region may lead to better outlier rejection.

The histogram may be considered in hue, saturation, and intensity (HSI) color space because the HSI color space separates color information into distinct color and intensity components. Hue and saturation bands may not be as sensitive to illumination changes as an intensity band.

The processing device may then determine a dominant color of the subset of image pixels in the segmented region (act 1304). When working with the HSI color space, a median value of hues within a dominant peak of the histogram may determine a dominant color. In other embodiments, color space other than the HSI color space may be used. For example, red, green, blue (RGB) color space, luminance and chrominance (YUV) color space, CIE 1976 (L*, u*, v*) (known as CIELUV) color space, or a color space of multiple bands of colors may be used in other embodiments consistent with the subject matter of this disclosure.

Next, the processing device may determine whether there are any additional subsets of image pixels to consider within the segmented image region (act 1306). If there are additional subsets of image pixels within the segmented image region to consider, then the processing device may shift the subset of image pixels by a single pixel within the segmented image region (act 1308). Acts 1302-1306 may again be performed to construct another histogram and determine a dominant color of the shifted subset of image pixels.

If, during act 1306, the processing device determines that there are no additional subsets of image pixels within the segmented image region, then the process is complete.

Returning to FIG. 11, the processing device may derive texture information based on the segmentation information and the at least one image (act 1106).

Figure 14:
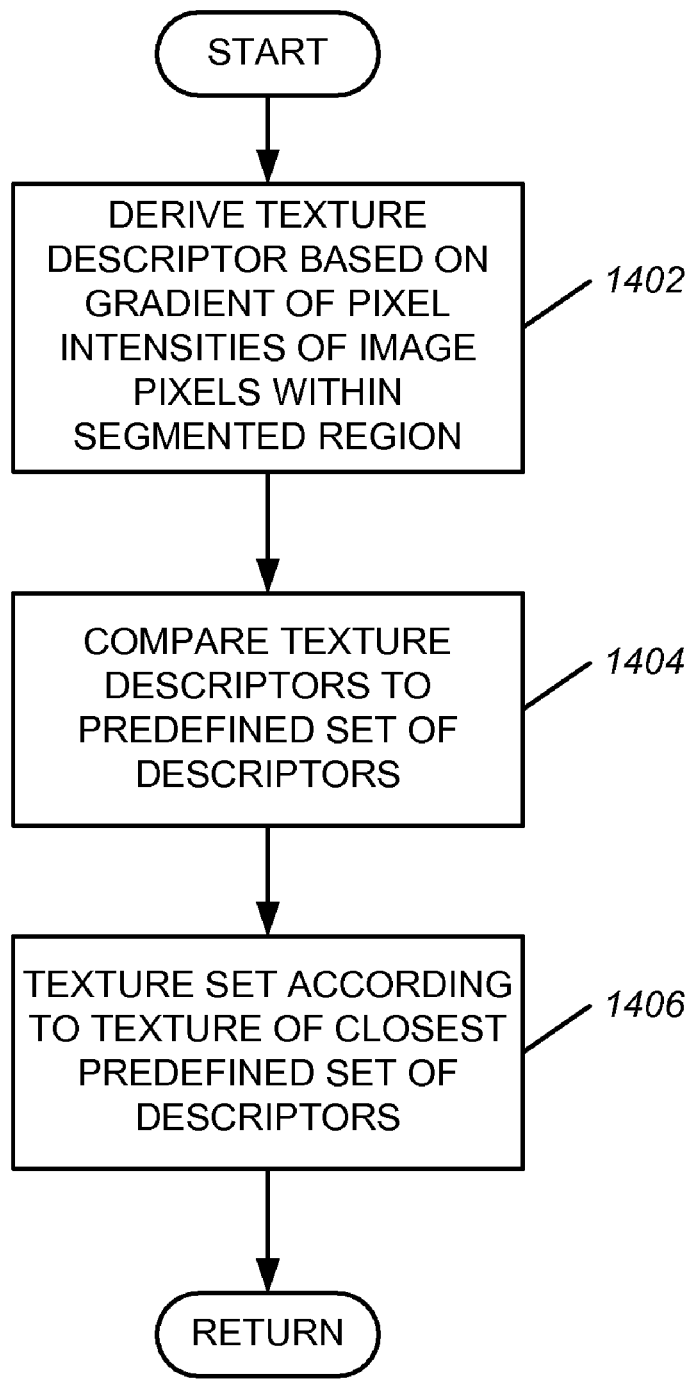

FIG. 14 is a flowchart illustrating an exemplary process for performing act 1106, in detail. The process may begin with the processing device deriving a texture descriptor based on a gradient of pixel intensities within a segmented image region (act 1402). In alternate embodiments, any texture analysis scheme may be employed, such as, for example, multiple-oriented filter banks or steerable filters.

The gradient of pixel intensities may account for scale because a same physical entity may be viewed in different images at different depths. Scale may be accounted for by considering a second moment matrix of the gradient of pixel intensities within a window and using eigenvalues of the second moment matrix. If the eigenvalues are close, there may be no preferred orientation. If both eigenvalues are small, a local patch of pixels within the segmented image region may be close to a uniform color. If one eigenvalue is large relative to another eigenvalue, the local patch of pixels may correspond to a unidirectional texture pattern.

Next, the processing device may compare the derived texture descriptor to a predefined set of texture descriptors (act 1404). For example, the predefined set of descriptors may include brick, glass, vinyl, wood, marble, leaves, plaster, stucco, windowed, tin, as well as other descriptors. The processing device may then set a texture based on a closest one of the predefined set of descriptors, as determined by act 1404 (act 1406).

Returning to FIG. 11, the processing device may derive structure information based on at least one 3-D model (act 1108). The structure information may include information with respect to a height of a structure, a number of stories of a building, a shape of a building, whether a building includes a plaza, glass facades, a spire, French windows, as well as other information. The processing device may then produce color, texture and structure cues and may store the color, the texture, and the structure cues (act 1110). In one embodiment, the color, the texture and the structure cues may be stored in a database of 3-D models. The process may then be completed.

Returning to FIG. 10, the processing device may provide navigational information based, at least partly, on the extracted non-photographic cues (act 1004). For example, a map may be provided showing an area, which may include an area illustrated in the at least one image. The map may include encoding of color, texture and structure cues, as previously described. One or more areas corresponding to the at least one image may be highlighted on the map. In another embodiment, textual information may be provided indicating an address or an intersection located closest to the area illustrated in the at least one image. In a third embodiment, speech may be generated which may provide information about the area illustrated in the at least one image.

In some embodiments, sequences of color, texture and structure cues, with respect to frequently visited locations, may be saved and newly produced sequences of color, texture, and structure cues may be added to the saved sequences to improve an ability for matching a sequence of color, texture, and structure cues to a location.

Figure 15:
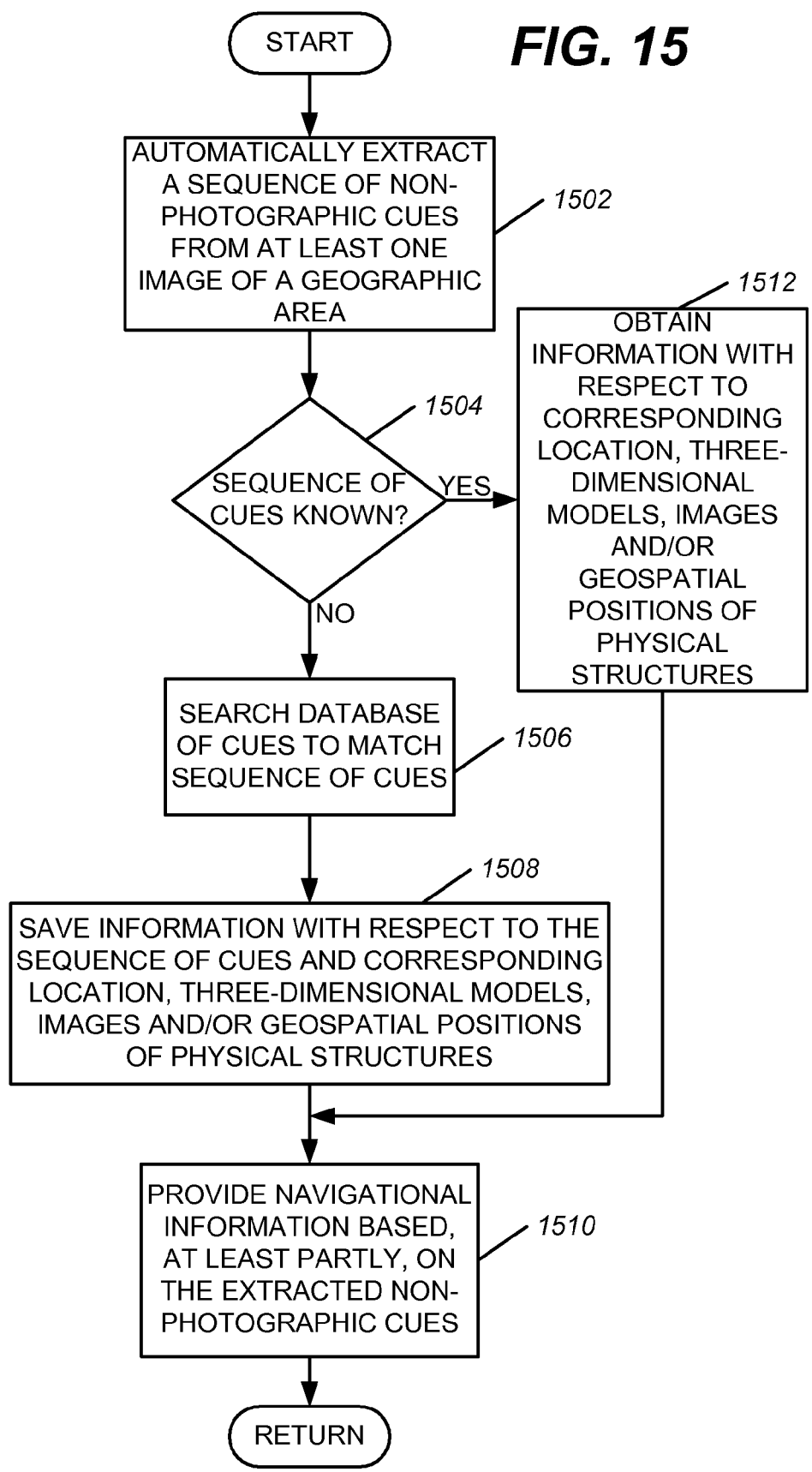

FIG. 15 is a flowchart illustrating an exemplary process, which may be performed in an embodiment consistent with the subject matter of this disclosure, for attempting to match a sequence of cues from at least one image to a location. The process may begin with a processing device automatically extracting a sequence of non-photographic cues from at least one image of a geographic area (act 1502). The non-photographic cues may include color cues, texture cues, structure cues, as well as other or different cues. In one embodiment, act 1502 may be performed as described, with respect to act 1002 (see FIGS. 10-14). The processing device may then determine whether the extracted sequence of non-photographic cues is known (act 1504).

If the processing device determines that the sequence of cues is not known, then a database of non-photographic cues may be searched for a matching sequence of non-photographic cues (act 1506). Information with respect to the sequence of cues, corresponding location, 3-D models, images and geospatial positions of physical structures may then be saved in a database (act 1508), thereby making the sequence of cues known. Saving the information with respect to the sequence cues may make matching a same sequence of cues easier and efficient at a later time.

If, during act 1504, the processing device determines that the sequence of cues is known (i.e., the sequence of cues matches a saved sequence of cues) then the processing device may obtain information with respect to a corresponding location, 3-D models, images and geospatial positions of physical structures (act 1512).

After performing either of act 1508 or act 1512, the processing device may provide navigational information based, at least partly, on the extracted non-photographic cues (act 1510). The navigational information may include information regarding one or more areas shown in the at least one image, information with respect to distances between points shown in the at least one image, as well as different or other information. The information may be displayed on a map, including encoded color, texture, and structure cues. Alternatively, the information may be provided in textual form or in generated speech form, as previously discussed.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 8-15, or may implement acts in a different order than as shown. Accordingly, the appended claims and their legal equivalents define the invention, rather than any specific examples given.

We claim as our invention:

1. A machine-implemented method for providing navigational information based, at least partly, on non-photographic cues, the machine-implemented method comprising:
    automatically extracting a sequence of the non-photographic cues from at least one image of a geographic area, the automatically extracting comprising:
        segmenting physical entities appearing in at least one image of a geographic area based on at least one three-dimensional model, including a representation of the geographic area, to produce segmentation information, deriving color information with respect to the physical entities appearing in the at least one image based on the produced segmentation information, and producing and storing color cues based on the color information, the extracted sequence of non-photographic queues including the color cues;

providing navigational information for traveling along a route from an origin to a destination, the navigational information including information based, at least partly, on the extracted sequence of non-photographic cues.

2. The machine-implemented method of claim 1, comprising:

determining which of the physical entities are ones of the physical entities that are observable by a party traveling along the route, and deriving a second sequence of non-photographic cues, with respect to the ones of the physical entities, the second sequence of non-photographic cues including at least some of the extracted sequence of non-photographic cues.

3. The machine-implemented method of claim 2, wherein:

the extracted non-photographic cues further include cues with respect to texture and structure of the physical entities within the geographic area, and the deriving of the second sequence of non-photographic cues, with respect to the ones of the physical entities, include the cues regarding the texture and the structure of the physical entities.

4. The machine-implemented method of claim 1, wherein the providing of navigational information for traveling along a route from an origin to a destination, further comprises:

providing the navigational information as text or generated speech.

5. The machine-implemented method of claim 1, wherein the providing of navigational instructions for traveling along a route from an origin to a destination, further comprises:

providing a map having the sequence of non-photographic cues encoded into ones of the physical entities represented on the map, the non-photographic cues including cues regarding a plurality of visual attributes of the physical entities.

6. The machine-implemented method of claim 5, wherein:

the map comprises at least one drawing including streets along the route and the ones of the physical entities, and the cues regarding the plurality of visual attributes of the physical entities include information with respect to color, texture, and structure.

7. The machine-implemented method of claim 2, wherein:

the provided navigational instructions include driving directions, and the second sequence of non-photographic cues include color, texture, and structure cues corresponding to the driving directions.

8. A processing device comprising:

at least one processor; and a memory connected to the at least one processor, the memory comprising:

instructions for automatically extracting non-photographic cues from at least one image of a geographic area, the extracted non-photographic cues being representative of a plurality of visual attributes of physical entities, the instructions for automatically extracting non-photographic cues from at least one image further comprising:

instructions for segmenting the physical entities appearing in the at least one image based on at least one three-dimensional model, including a representation of the geographic area, to produce segmentation information, and instructions for deriving color information, or texture information, or both the color information and the texture information based, at least partly, on the segmentation information; and instructions for providing navigational information based, at least partly, on the extracted non-photographic cues.

9. The processing device of claim 8, wherein the instructions for automatically extracting non-photographic cues from at least one image of a geographic area further comprise:

instructions for deriving the color information with respect to the physical entities appearing in the at least one image based on the produced segmentation information and the at least one image.

10. The processing device of claim 9, wherein the instructions for automatically extracting non-photographic cues from at least one image of a geographic area further comprise:

instructions for deriving the texture information with respect to the physical entities appearing in the at least one image based, at least partly, on the segmentation information and the at least one image.

11. The processing device of claim 8, wherein:

the instructions for automatically extracting non-photographic cues from at least one image of a geographic area further comprise:

instructions for deriving the color information with respect to the physical entities appearing in the at least one image based, at least partly, on the segmentation information and the at least one image, instruction for deriving structure information based, at least partly, on the at least one three dimensional model of the geographic area, and instructions for producing color and structure cues based, at least partly, on the segmentation information, the color information, and the structure information, and the instructions for providing navigational information based, at least partly, on the extracted cues further comprise:

instructions for using the produced color and structure cues to provide information about a location and to provide distance information.

12. The processing device of claim 8, wherein:

the instructions for automatically extracting non-photographic cues from at least one image of a geographic area further comprise:

instructions for deriving the color information with respect to the physical entities appearing in the at least one image based, at least partly, on the segmentation information and the at least one image, instruction for deriving structure information based, at least partly, on the at least one three dimensional model of the geographic area, instructions for deriving the texture information based, at least partly, on the at least one image and the segmentation information, and instructions for producing color, structure and texture cues based, at least partly, on the segmentation information, the color information, the structure information, and the texture information;

the memory further comprising:

instructions for saving information with respect to a sequence of the color, structure and texture cues for a location, and instructions for using the saved information at a later time, with respect to a sequence of the color, structure and texture cues for the location.

13. The processing device of claim 8, wherein:
the instructions for automatically extracting non-photographic cues from at least one image of a geographic area further comprise:
instructions for deriving the color information with respect to the physical entities appearing in the at least one image based, at least partly, on the segmentation information and the at least one image,
instruction for deriving structure information based, at least partly, on the at least one three dimensional model of the geographic area,
instructions for deriving the texture information based, at least partly, on the at least one image and the segmentation information, and
instructions for producing color, structure and texture cues based, at least partly, on the segmentation information, the color information, and the structure information, and the texture information, and
the instructions for providing navigational information further comprise:
instructions for presenting a simplified drawing as a map, the map having the color, structure and texture cues encoded therein.

14. A tangible machine-readable medium having instructions recorded thereon for at least one processor, the instructions comprising:
instructions for extracting color and texture cues from a plurality of images of a geographic area based, at least partly, on projecting a mesh from at least one three-dimensional model onto the plurality of images, the instructions for extracting color and texture cues from a plurality of images of a geographic area further comprising:
instructions for projecting meshes from three-dimensional models onto physical entities appearing in the plurality of images using calibration parameters of the plurality of images to produce segmented image regions,
instructions for deriving color information with respect to physical entities appearing in the plurality of images based, at least partly, on the produced segmented image regions, and
instructions for deriving texture information with respect to the physical entities appearing in the plurality of images based, at least partly, on the produced segmented image regions;
instructions for forming a sequence of visual cues with respect to ones of the physical entities along a determined route based, at least partly, on the extracted color and texture cues; and
instructions for providing driving directions to a destination, the driving directions including a reference to the sequence of visual cues.

15. The tangible machine-readable medium of claim 14, wherein the instructions for providing driving directions to the destination further comprise:
instructions for providing a map having the sequence of visual cues encoded therein.

16. The tangible machine-readable medium of claim 14, wherein the instructions for providing driving directions to a destination further comprise:
instructions for producing a map having the sequence of visual cues encoded therein, and
instructions for adding pushpins or hotspots to the map.

17. The tangible machine-readable medium of claim 14 wherein the instructions for extracting color and texture cues for a plurality of images of a geographic area further comprise:
instructions for forming histograms of image pixels over image areas corresponding to building facades, and
instructions for determining a dominant color of the histograms of image pixels based on a median value of hues within a dominant peak of the histogram.

18. The tangible machine-readable medium of claim 14, wherein the instructions for extracting color and texture cues for a plurality of images of a geographic area further comprise:
instructions for determining texture descriptors based on a gradient of intensities of image pixels within the segmented regions, and
instructions for determining textures by comparing the texture descriptors to a predefined set of descriptors.

19. The tangible machine-readable medium of claim 14, wherein:
the instructions for extracting color and texture cues from a plurality of images of a geographic area further comprise instructions for extracting structure cues from a plurality of images of a geographic area, and
the instructions recorded on the tangible medium further comprise instructions for providing navigational information based, at least partly, on the extracted color cues, the extracted texture cues, and the extracted structure cues from the plurality of images of the geographic area.

20. The tangible machine readable medium of claim 14, wherein the instructions further comprise:
instructions for producing the color and texture cues based on the derived color information and the derived texture information.

* * * * *

UNITED STATES PATENT AND TRADEMARK OFFICE
CERTIFICATE OF CORRECTION

| | | |
|---|---|---|
| PATENT NO. | : 8,046,167 B2 | |
| APPLICATION NO. | : 12/117734 | |
| DATED | : October 25, 2011 | |
| INVENTOR(S) | : Pragyana K. Mishra et al. | |

It is certified that error appears in the above-identified patent and that said Letters Patent is hereby corrected as shown below:

In column 9, line 15, in Claim 2, after "claim 1," insert -- further --.

In column 11, line 19, in Claim 13, after "information," delete "and".

Signed and Sealed this
Twenty-ninth Day of November, 2011

David J. Kappos
*Director of the United States Patent and Trademark Office*